S. R. SMITH.
DEVICE FOR TEACHING PENMANSHIP.
APPLICATION FILED JUNE 2, 1908.
940,744.
Patented Nov. 23, 1909.
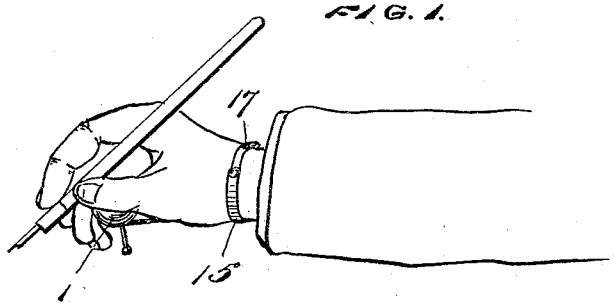
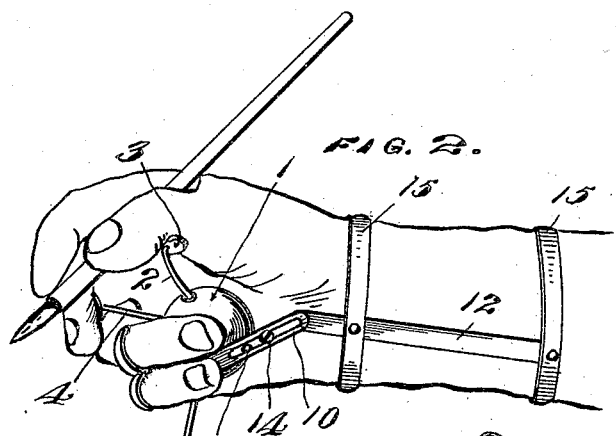
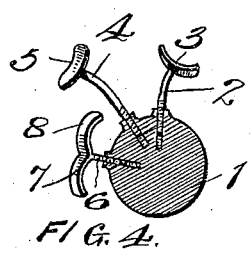
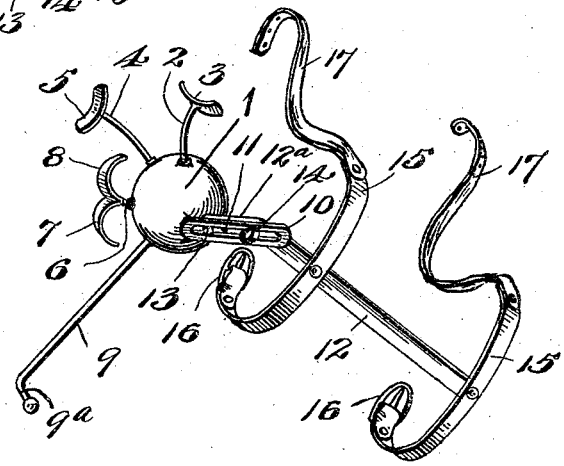
WITNESSES
Chas. K. Davies.
J. Stewart Rice.
INVENTOR
S. R. Smith,
By C. L. Parker, Attorney

UNITED STATES PATENT OFFICE.

SIDNEY R. SMITH, OF GAINESVILLE, TEXAS.

DEVICE FOR TEACHING PENMANSHIP.

940,744.	Specification of Letters Patent.	Patented Nov. 23, 1909.

Application filed June 2, 1908. Serial No. 436,261.

*To all whom it may concern:*

Be it known that I, SIDNEY R. SMITH, a citizen of the United States, residing at Gainesville, in the county of Cooke and State of Texas, have invented certain new and useful Improvements in Devices for Teaching Penmanship, of which the following is a specification.

This invention relates to improvements in devices designed for use in teaching penmanship, and has for its object to provide a device, which, while simple in construction, will, by mechanical means, effectually prevent writing solely by movement of the fingers and compel the student to adopt a free, muscular movement in writing.

In the accompanying drawing, Figure 1 shows a fore arm and hand supported in a proper writing position by means of my improved device; Fig. 2 shows a hand and a portion of the fore arm with my device applied thereto, said hand and fore arm being turned to show the palm to illustrate the manner in which my device is applied, and the disposition of the various parts of the device. Fig. 3 is a perspective view of my device, and Fig. 4 is a sectional view taken through the ball on the line of the connection thereto of the various supporting arms, illustrating their adjustable screw connection thereto, the supporting bar and its connections being not shown.

Referring to the drawing, which illustrates the preferred form of my invention, 1 designates a spherical body or ball, which may obviously be of any suitable shape, and which is preferably made of aluminum to secure lightness. To the ball 1 is secured a slightly curved arm 2 provided at its outer end with a bow-shaped piece of metal 3, which is adapted to serve as a support or rest for the thumb. The arm 2 is threaded at its lower end and adapted to be screwed into the ball in order that it can be adjusted. To one side of the arm 2 is a second arm 4, which, like arm 2, is slightly curved but is a little longer and carries a bow-shaped piece of metal 5 on the outer end thereof, which is designed to support the middle finger. This arm 4 is also adjustable by being threaded at its lower end in order that it can be screwed into and out of the ball to secure a proper adjustment thereof. A short arm 6, likewise adjustably mounted upon the ball, is provided with two divergently curved fingers 7 and 8 under which the fourth and fifth fingers are designed to be confined.

Extending laterally from the ball 1 is an arm 9 provided with a portion 9$^a$ bent angularly to form a bearing. This arm 9 is also adjustably secured to the ball by a screw threaded engagement. While the ball and the adjustable arms carried thereby serve to properly position the fingers, the laterally extending arm 9 supports the hand in the proper position by preventing it from turning too far over to the right, as is the tendency, when learning to write.

Suitably attached to the underside of the ball is a short bar 10 provided with a longitudinal slot 11 therein. Designed to be connected to this bar is a metal strip or bar 12 of greater length, with its forward end bent to form an extension 12$^a$ and provided with a stud or lug 13 at its extreme forward end. The strip or bar 12 is designed to be adjustably connected to the bar 10 by a set screw 14 passing through the slot 11 and into the said strip or bar, and the stud or lug 13 projecting through said slot prevents the strip or bar 12 from angular movement relative to the bar 10.

The strip or bar 12 has riveted or otherwise secured thereto bow-shaped members 15, 15, which are provided with buckles 16, 16, and straps 17, 17 for the purpose of securing the device to the wrist, which obviates the necessity of gripping the ball in the palm of the hand.

From the foregoing description it will be apparent that I have produced a device that can be readily adjusted to any size hand and will prevent a person from falling into incorrect methods in acquiring the art of writing.

Having described my invention, what I claim, is,

1. In a device of the character described, a ball adapted to be held in the hand, and longitudinally adjustable means carried by said ball for maintaining the fingers in proper position for writing, substantially as described.

2. In a device of the character described, a ball adapted to be held in the hand, adjustable means carried by said ball for maintaining the fingers in proper position for writing, and means carried by said ball for maintaining the hand in proper position for writing, substantially as described.

3. In a device of the character described, a ball adapted to be held in the hand, adjustable means carried by said ball for maintaining the fingers in proper position for writing, adjustable means carried by said ball for maintaining the hand in proper position for writing and means to secure the device to the wrist of the wearer.

4. In a device of the character described, a ball adapted to be held in the hand, adjustable means carried by said ball for maintaining the fingers in proper position for writing, adjustable means for maintaining the hand in proper position for writing and adjustable means for securing said device to the wrist of the wearer.

In testimony whereof I affix my signature in presence of two witnesses.

SIDNEY R. SMITH.

Witnesses:
J. M. PROFFER,
J. A. WHITTEN.